United States Patent
Moon

Patent Number: 5,780,808
Date of Patent: Jul. 14, 1998

[54] ARC SENSING METHOD IN AUTOMATED WELDING

[75] Inventor: Seung-bin Moon, Suwon, Rep. of Korea

[73] Assignee: Samsung Electronics Co., Ltd., Kyungki-do, Rep. of Korea

[21] Appl. No.: 808,428

[22] Filed: Feb. 28, 1997

[51] Int. Cl.⁶ ................................................. B23K 9/127
[52] U.S. Cl. .............................. 219/124.34; 219/125.12
[58] Field of Search .................... 219/125.12, 124.22, 219/124.34

[56] References Cited

U.S. PATENT DOCUMENTS

| | | | |
|---|---|---|---|
| 4,485,291 | 11/1984 | Nomura et al. | 219/125.12 |
| 4,587,398 | 5/1986 | Sarugaku et al. | 219/125.12 |
| 4,988,201 | 1/1991 | Sugitani et al. | 219/124.34 |

Primary Examiner—Clifford C. Shaw
Attorney, Agent, or Firm—Burns, Doane, Swecker & Mathis, L.L.P.

[57] ABSTRACT

An arc sensing method in an automated welding process for accurately adjusting a position of a weaving center of a welding torch with respect to a welding center line on the basis of a change in an arc current according to the change in distance between a lower end of the welding torch and a welding surface during weaving of the welding torch, is disclosed. The arc sensing method is accomplished by detecting the position of the weaving center of the welding torch with respect to the welding center line using the differential value of the arc current. Therefore, the position of the weaving center of the welding torch is accurately determined regardless of the degree of inclination of welding surfaces or the position of the base metals with respect to the welding torch. Accordingly, welding in a state in which the welding torch is off-center from the welding center line can be prevented.

2 Claims, 7 Drawing Sheets

ARC SENSING METHOD IN AUTOMATED WELDING

BACKGROUND OF THE INVENTION

The present invention relates to automated welding, and more particularly, to an arc sensing method in which the center position from which a welding torch weaves across is adjusted to correspond to a welding center line during an automated welding process.

When welding two base metals using a welding robot, it is essential that welding be performed while a welding torch of the welding robot accurately traces a welding center line, i.e., the line between the two base metals to be welded. The above can be performed by an arc sensing method in which an arc current is generated between the welding torch and the base metals as the welding torch moves reciprocally (weaves) across a center position and the welding torch traces along the welding center line based on the change in the arc current according to the change in distance between the welding torch and the welding surface. Such a method will be described in detail with respect to the accompanying drawings.

As shown in FIGS. 1 and 2, when welding by the automated welding, first and second base metals 20 and 30 of which ends to be welded are in contact with each other, a welding torch 10 weaves across a contact line, i.e., a welding center line 25 between the base metals 20 and 30 as indicated by the imaginary lines while proceeding along the welding center line 25 in a direction A. The welding torch 10 is disposed such that an angle θ between the axis of the welding torch 10 and the welding surface 21 of the first base metal 20 and an angle θ' between the axis of the welding torch 10 and the welding surface 31 of the first base metal 30 are equal to each other. The weaving center C of the welding torch 10 is directly above the welding center line 25. That is, the welding torch 10 moves left and right an equal distance L from the weaving center C when C is directly above the welding center line 25.

During weaving, the welding torch 10 reciprocates between positions located farthest away from the weaving center C toward the first and second base metals 20 and 30 (hereinafter called a first position and a second position). The vertical distance H1 between the lower end of the welding torch 10 and the first base metal 20 at the first position is equal to that between the lower end of the welding torch 10 and the second base metal 30 at the second position. At a position where the welding torch 10 is directly above the weaving center C, the vertical distance H between the lower end of the welding torch 10 and the welding center line 25 is at a maximum.

FIG. 3 is a graph showing the change in the vertical distance between the lower end of the welding torch 10 and the welding surface 21 of the first base metal 20 or the welding surface 31 of the second base metal 30 as the torch 10 weaves between the first position and the second position, in which t1 along the horizontal axis is the time required for the torch 10 to move from the first position to the second position and the vertical axis is the distance between the torch end and the surface of one of the base metals. The vertical distance between the lower end of the welding torch 10 and the welding surface 21 of the first base metal 20 increases as the welding torch 10 moves toward the weaving center C until reaching a maximum at t½. Then, as the welding torch 10 moves toward the second position after passing the weaving center C, the vertical distance decreases.

In the meantime, when a high voltage is supplied between the welding torch 10 and the base metals 20 and 30, an arc current is generated between the welding torch 10 and the base metals. The arc current decreases as the vertical distance between the lower end of the welding torch 10 and the welding surface of the base metal increases. Thus, the arc current varies as shown in FIG. 4 relative to the vertical distance of FIG. 3.

According to a conventional arc sensing method, integral values of currents during the movement from the first position to the weaving center C and that from the weaving center C to the second position are obtained based on the changing arc current, respectively, and then the obtained integral values are compared to each other. In the case that the respective integral values are identical to each other, it is determined that the weaving center C of the welding torch 10 is moving along the welding center line 25, that is, the welding torch 10 is accurately tracing the welding center line 25.

When the respective integral values are different from each other, it is determined that the weaving center C of the welding torch 10 does not correspond to the welding center line 25, that is, the welding torch 10 does not accurately trace the welding center line 25. In such a case, the welding torch 10 can accurately trace the welding center line 25 by adjusting the position of the weaving center C by a real time process to make the integral values equal each other by means of an additional controller (not shown).

However, according to the conventional arc sensing method based on the integral values of the arc current, the method is only effective when the angle θ between the welding surface 21 of the first base metal 20 and the welding torch 10 and the angle θ' between the welding surface 31 of the second base metal 30 and the welding torch 10 are equal with each other. When the above angles are different from each other, considerable errors are generated.

For instance, as shown in FIG. 5, although the weaving center C of the welding torch 10 is located above the welding center line 25, since the base metals 20 and 30 are disposed at an angle, that is, θ1 is not equal to θ2, the vertical distance H2 between the lower end of the welding torch 10 and the welding surface 21 of the first base metal 20 at the first position and vertical distance H3 between the lower end of the welding torch 10 and the welding surface 31 of the second base metal 30 at the second position are not equal to each other.

Thus, as the welding torch 10 moves between the first position and the second position, the vertical distance between the lower end of the welding torch 10 and the respective welding surfaces varies as shown in FIG. 6. That is, the vertical distance between the lower end of the welding torch 10 and the surface 21 of the first base metal 20 sharply increases during the time t½, while the vertical distance between the lower end of the welding torch 10 and the surface 31 of the second base metal 30 gradually decreases during the movement from the weaving center C to the second position. As shown in FIG. 7, the arc current value changes according to the change in the vertical distance.

In such a state, the integral value of the current during the movement from the first position to the weaving center C and that during the movement from the weaving center C to the second position differ from each other. Accordingly, the weaving center C is determined to be off center with respect to the welding center line 25 although the welding torch 10 accurately traces the welding center line 25. Thus, compensation is made such that the position of the weaving center C of the welding torch 10 is moved toward the first base metal 20 so that the integral values are the same by the controlling means. Therefore, welding is performed in a state in which the welding torch 10 does not accurately trace the welding center line 25.

SUMMARY OF THE INVENTION

To solve the above problems, it is an object of the present invention to provide an arc sensing method for an automated welding process in which a position of a weaving center of a welding torch with respect to a welding center line is accurately corrected, regardless of the degree of inclination of welding surfaces of base metals with respect to the welding torch, whereby the welding torch can accurately trace the welding center line during welding.

Accordingly, to achieve the above object, there is provided an arc sensing method in an automated welding process for accurately adjusting a position of a weaving center of a welding torch with respect to a welding center line on the basis of a change in an arc current according to the change in distance between a lower end of the welding torch and a welding surface during weaving of the welding torch, the arc sensing method comprising the step of: detecting the position of the weaving center of the welding torch with respect to the welding center line using the differential value of the arc current.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
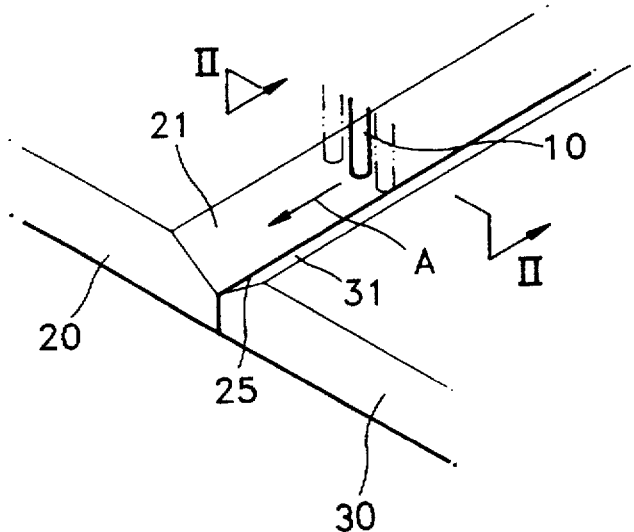
FIG. 1 is a perspective view schematically illustrating a welding torch and base metals to be welded.
Figure 2:
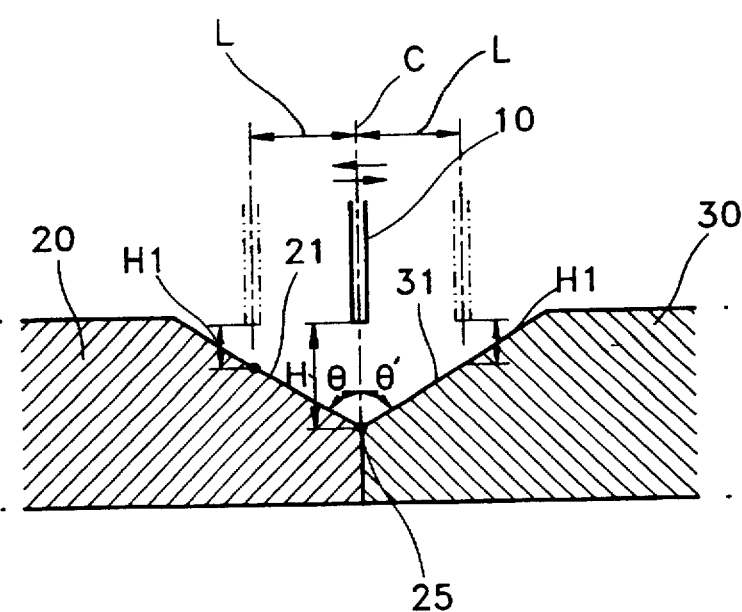
FIG. 2 is a sectional view taken along line II—II of FIG. 1.

First, the case as shown in FIG. 2 will be described. The welding torch 10 weaves during welding in a state in which the angle $\theta$ between the axis of the welding torch 10 and the welding surface 21 of the first base metal 20 is equal to the angle $\theta$ between the axis and the welding surface 31 of the second base metal 30 and the weaving center C is located above the welding center line 25.

Figure 3:
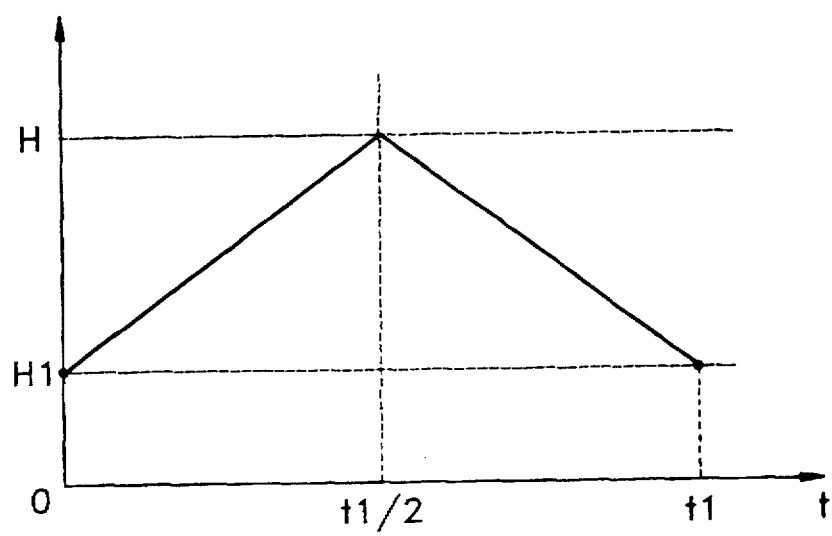
FIG. 3 is a graph showing the change in the vertical distance between the lower end of the welding torch and welding surfaces of the base metals as the welding torch moves from a first position to a second position in the state shown in FIG. 2.
Figure 4:
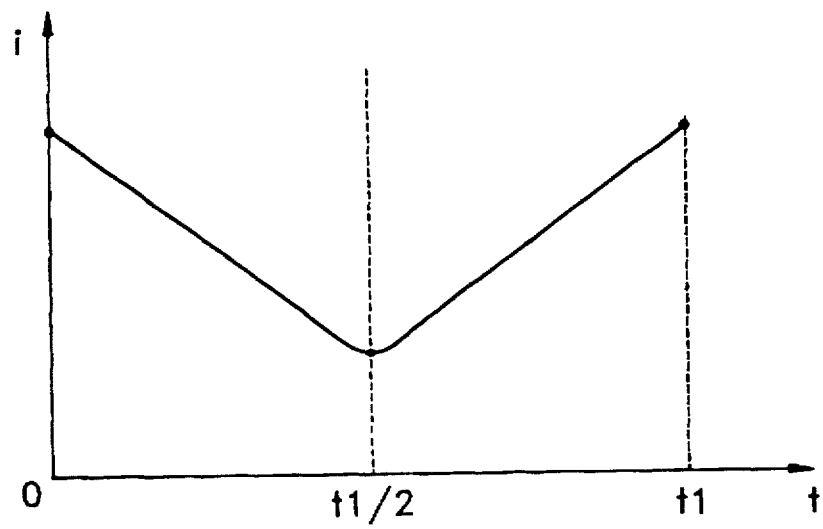
FIG. 4 is a graph showing the change in the arc current during the movement of the welding torch from the first position to the second position.

As described earlier, during weaving, the welding torch 10 reciprocates between first and second positions. While the welding torch 10 is moved from the first position to the second position, the vertical distance between the lower end of the welding torch 10 and the welding surfaces 21 and 31 of the first and second base metals 20 and 30 changes as shown in FIG. 3 and the arc current varies as shown in FIG. 4.

Figure 8:
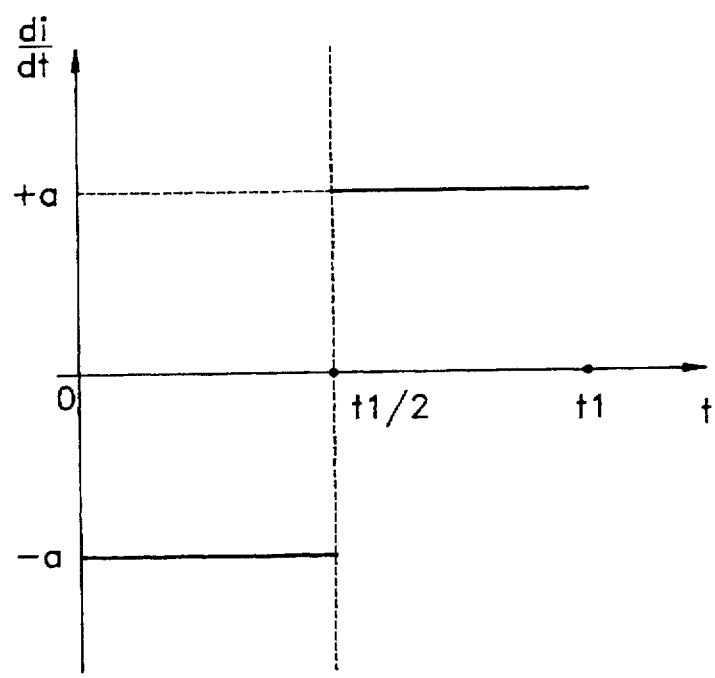
FIG. 8 is a graph indicating a differential value of the arc current with respect to time which varies as shown in FIG. 4.

When the above arc current is differentiated with respect to time, the result is as shown in FIG. 8. That is, the differential value of the current from the first position to the welding center line 25 has a predetermined negative value ($-a$) while the differential value of the current from the welding center line 25 to the second position has a positive value ($+a$). The absolute values of the respective differential values equal to each other. The differential value at the weaving center C is "0".

When the weaving center C of the welding torch 10 is off-center toward the second base metal 30, the differential value of the arc current at the time when the welding torch 10 is located at the weaving center C is positive ($+a$) not "0". Accordingly, the position of the welding torch 10 is compensated for in real time by an additional controller (not shown) so that the weaving center C of the welding torch 10 is moved toward the welding center line 25. On the contrary, when the weaving center C of the welding torch 10 deviates toward the first base metal 20, the differential value of the arc current at the time when the welding torch 10 is located at the weaving center C is negative ($-a$). Accordingly, the position of the welding torch 10 is adjusted in real time by the additional controller so that the weaving center C of the welding torch 10 is moved toward the welding center line 25.

Figure 5:
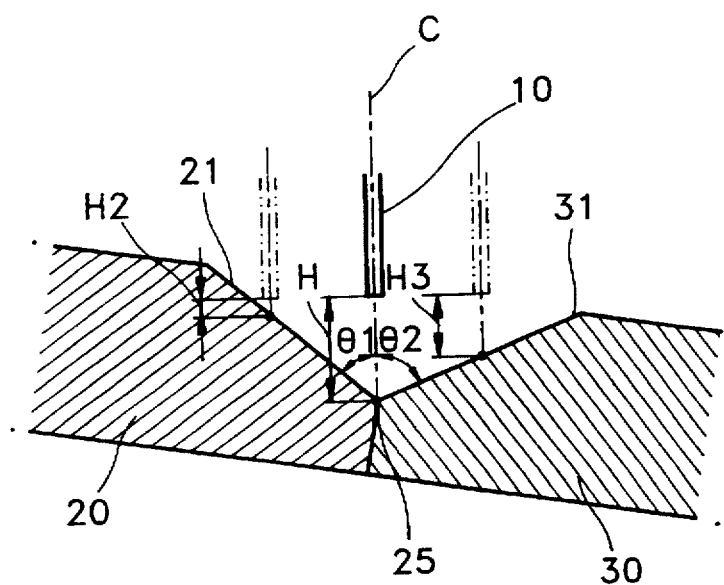
FIG. 5 is a sectional view schematically illustrating a state in which the base metals are at an angle with respect to the welding torch.
Figure 6:
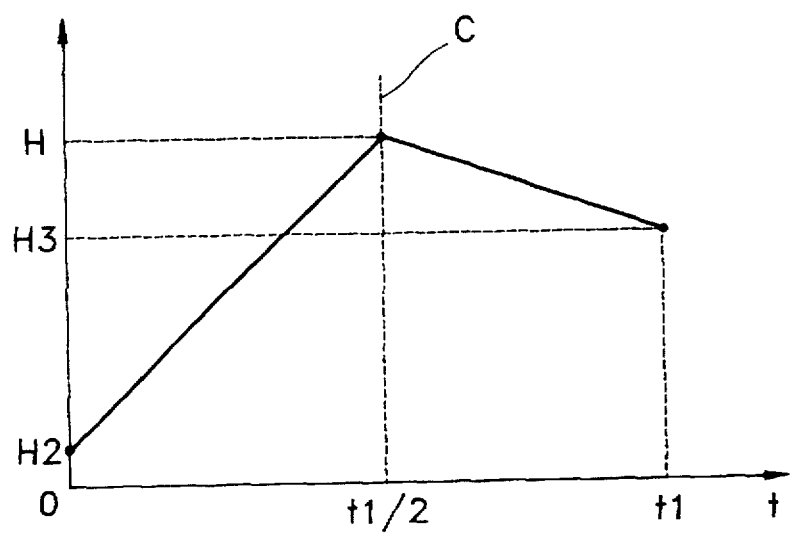
FIG. 6 is a graph indicating the change in the vertical distance between the lower end of the welding torch and welding surfaces of the base metals as the welding torch moves from a first position to a second position in the state shown in FIG. 5.

In the meantime, when $\theta 1$ between the welding surface 21 of the first base metal 20 and the axis of the welding torch 10 differs from the $\theta 2$ between the welding surface 31 of the second base metal 30 as shown in FIG. 5, in a state in which the weaving center C of the welding torch 10 is directly above the welding center line 25, the vertical distance H2 between the lower end of the welding torch 10 and the welding surface 31 of the first base metal 20 at the first position and the vertical distance H3 between the lower end of the welding torch 10 and the welding surface 31 of the first base metal 30 at the second position differ from each other. In such a state, the vertical distance between the lower end of the welding torch 10 and the welding surface 21 or 31 varies as shown in FIG. 6 during the movement of the welding torch 10 from the first position to the second position. Accordingly, the arc current varies as shown in FIG. 7.

Figure 7:
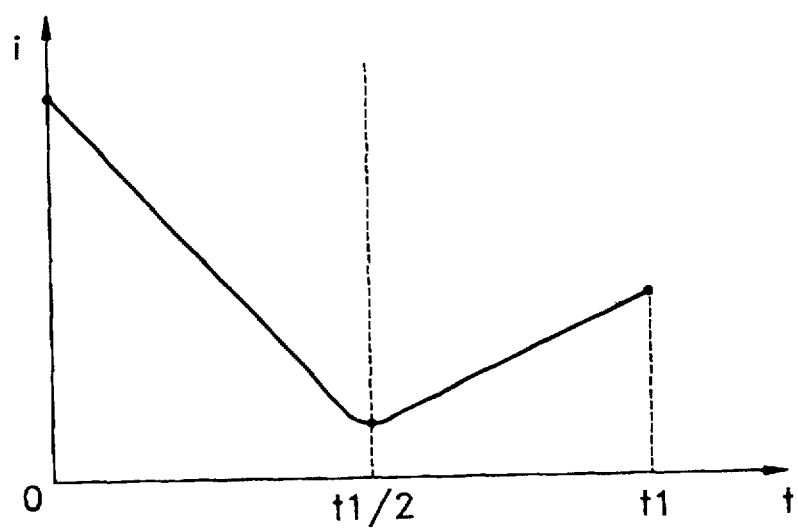
FIG. 7 is a graph indicating the change in the arc current according to the change of the vertical distance as shown in FIG. 6.
Figure 9:
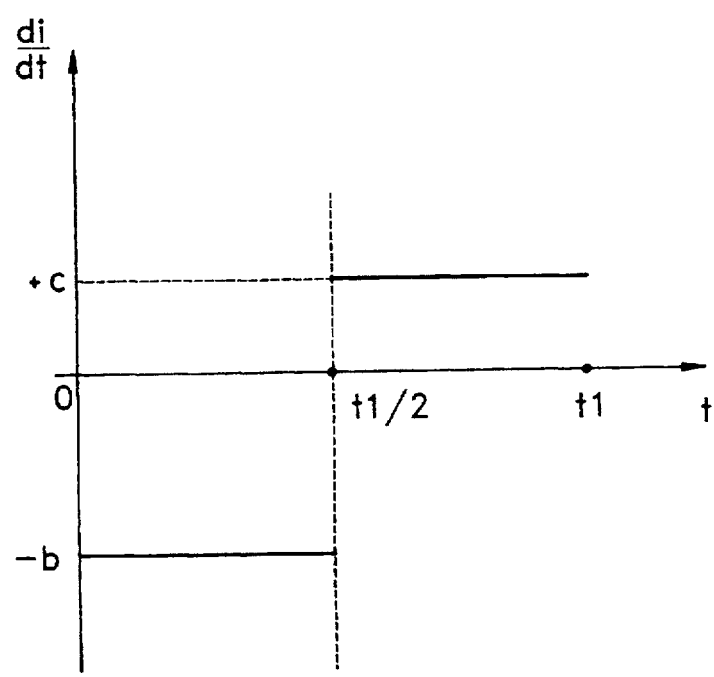
FIG. 9 is a graph indicating a differential value of the arc current with respect to time which varies as shown in FIG. 7.

The differential value of the current which varies as shown in FIG. 7 is shown in FIG. 9. That is, the differential value of the current from the first position to the weaving center C has a negative value (−b) and that of the current from the weaving center C to the second position has a positive value (+c). Since the slopes of the current with respect to time from 0 to t½ differs from that between t½ to t1, the absolute values of the first differential value (−b) and the second differential value (+c) differ from each other as well. However, the differential value at the welding center line is "0". That is, since the weaving center C of the welding torch 10 follows the welding center line 25 in a state in which the welding torch 10 accurately traces the welding center line 25, the differential value of the arc current value with respect to time when the welding torch 10 corresponds to the weaving center C is "0". Thus, contrary to the conventional art, an accurate determination can be made when the base metals 20 and 30 are at an angle with respect to the axis of the welding torch 10.

Figure 10:
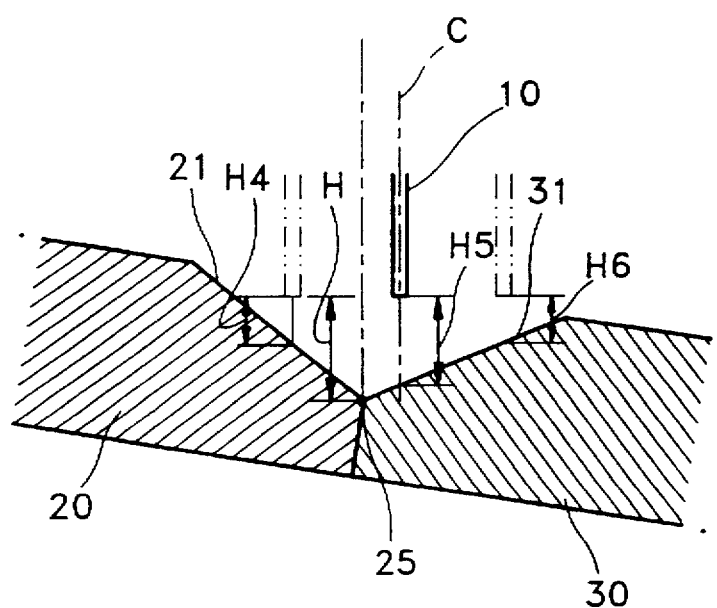
FIG. 10 is a sectional view schematically showing a state in which the weaving center of the welding torch is off-center from the welding center line and the base metals are at an angle with respect to the welding torch.

When the weaving center C of the welding torch 10 is off-center toward the second base metal 30 as shown in FIG. 10 in a state in which the base metals 20 and 30 are at an angle as shown in FIG. 5, the vertical distance H5 between the lower end of the welding torch 10 and the welding surface 31 when the welding torch 10 is located on the weaving center C differs from the vertical distance H between the lower end of the welding torch 10 and the welding center line 25. The vertical distance between the lower end of the welding torch 10 and the welding surface 21 of the first base metal at the first position is H4, while that between the lower end of the welding torch 10 and the welding surface 31 of the second base metal at the second position is H6.

Figure 11:
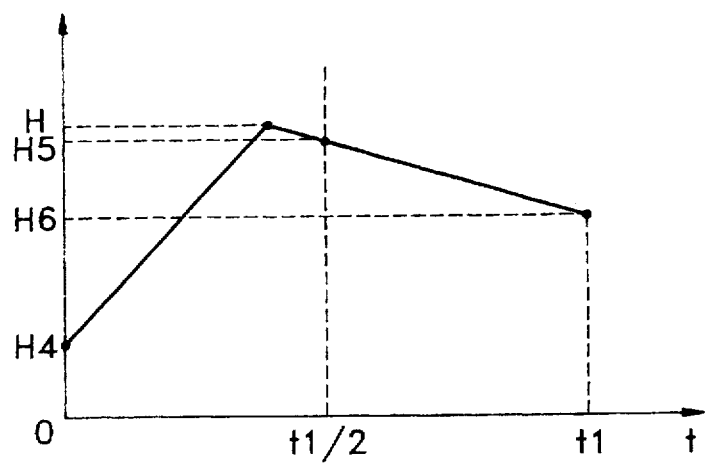
FIG. 11 is a graph indicating the change in the vertical distance between the lower end of the welding torch and the welding surfaces of the base metals as the welding torch moves from the first position to the second position in the state shown in FIG. 10.
Figure 12:
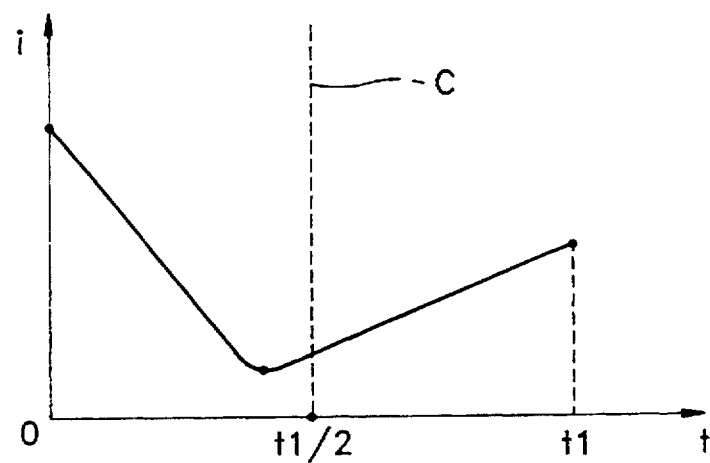
FIG. 12 is a graph indicating the change in the arc current according to the change in the vertical distance as shown in FIG. 10.

In such a case, the vertical distance and current between the lower end of the welding torch 10 and the welding surfaces 21 or 31 during the movement of the welding torch 10 from the first position to the second position, vary as shown in FIGS. 11 and 12, respectively.

Figure 13:
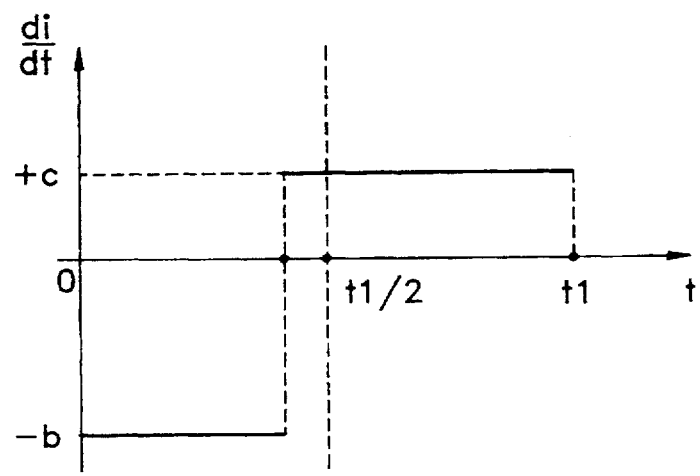
FIG. 13 is a graph indicating a differential value of the arc current which varies as shown in FIG. 12.

The differential value of the current varying as shown in FIG. 12 is shown in FIG. 13. That is, while the differential value of the arc current when the welding torch 10 is located directly above the welding center line 25 remains at "O", that of the arc current when the welding torch 10 is consistent with the weaving center C, i.e., when t is t½, remains the second value (+c).

The fact that the differential value of the current when the welding torch 10 is located at the weaving center C has a positive second value (+c) means that the weaving center C of the welding torch 10 is off-center toward the second base metal 30. Accordingly, the position of the welding torch 10 is adjusted in real time such that the weaving center C thereof is moved by the controller toward the welding center line 25.

As described above, in the arc sensing method according to the present invention, the position of the weaving center of the welding torch is accurately adjusted regardless of the degree of inclination of the welding surfaces or the position of the base metals with respect to the welding torch. Accordingly, automated welding in a state in which the welding torch is off-center from the welding center line can be prevented.

What is claimed is:

1. An arc sensing method in an automated welding process for accurately adjusting a position of a weaving center of a welding torch with respect to a welding center line on the basis of a change in an arc current according to the change in distance between a lower end of said welding torch and a welding surface during weaving of said welding torch, said arc sensing method comprising the steps of:

determining derivative values of the arc current; and detecting the position of the weaving center of said welding torch with respect to the welding center line on the basis of the determined derivative values of the arc current.

2. An arc sensing method in an automated welding process as claimed in claim 1, further comprising the step of adjusting the position of said welding torch such that the derivative value of the arc current is "0" when the derivative value of the arc current is not "0" at the weaving center of said welding torch.

* * * * *